United States Patent
Scott

(10) Patent No.: US 6,907,603 B2
(45) Date of Patent: Jun. 14, 2005

(54) SOFTWARE UPDATE MANAGEMENT SYSTEM WITH UPDATE CHRONOLOGY GENERATOR

(75) Inventor: John Charles Scott, Stratham, NH (US)

(73) Assignee: Hewlett-Packard Development Company, L.P., Houston, TX (US)

(*) Notice: Subject to any disclaimer, the term of this patent is extended or adjusted under 35 U.S.C. 154(b) by 45 days.

(21) Appl. No.: 10/673,842

(22) Filed: Sep. 29, 2003

(65) Prior Publication Data

US 2004/0073900 A1 Apr. 15, 2004

Related U.S. Application Data

(63) Continuation of application No. 09/732,392, filed on Dec. 7, 2000, now abandoned.

(51) Int. Cl.$^7$ ............................................. G06F 9/44
(52) U.S. Cl. .................... 717/168; 717/169; 717/170; 717/172; 707/1; 707/101; 707/203
(58) Field of Search ............................... 717/168–172; 707/1, 10, 101, 103

(56) References Cited

U.S. PATENT DOCUMENTS

| | | | | |
|---|---|---|---|---|
| 4,558,413 A | * | 12/1985 | Schmidt et al. | 707/203 |
| 5,208,765 A | * | 5/1993 | Turnbull | 702/84 |
| 5,430,869 A | * | 7/1995 | Ishak et al. | 707/101 |
| 5,574,898 A | * | 11/1996 | Leblang et al. | 707/1 |
| 5,960,189 A | * | 9/1999 | Stupek et al. | 717/169 |
| 6,192,365 B1 | * | 2/2001 | Draper et al. | 707/101 |
| 6,367,075 B1 | * | 4/2002 | Kruger et al. | 717/169 |
| 6,523,035 B1 | * | 2/2003 | Fleming et al. | 707/10 |

OTHER PUBLICATIONS

Title: Access methods for multiversion data, aurhor: Lomet et al, 1989, ACM.*
Title: Version Modeling Concepts for Coputer–Aided Design Databases, author: Kotz et al, ACM, 1986.*

* cited by examiner

Primary Examiner—Chameli C. Das

(57) ABSTRACT

An update management system provides access to software updates (patches and upgrades) and to an update catalog server. The catalog server includes a chronology generator. When a request for an update family tree for a target update is received, the chronology generator accesses an index to find the database and record number for the target update. The record is retrieved, indicating updates superseded by the target update and updates superseding the target update. Records for the superseded and superseding updates are, in turn, retrieved. The process is iterated until there are no further superseding and no superseded updates indicated. The succession relations indicated in the retrieved records are arranged into a family tree for the target patch. The family tree can be used (along with dependency data) to help determine an update for a given workstation that optimizes performance and compatibility.

10 Claims, 2 Drawing Sheets

SOFTWARE UPDATE MANAGEMENT SYSTEM WITH UPDATE CHRONOLOGY GENERATOR

CROSS-REFERENCE TO RELATED APPLICATIONS

This is a continuation of application Ser. No. 09/732,392, filed on Dec. 7, 2000 now abandoned, which is hereby incorporated by reference herein.

BACKGROUND OF THE INVENTION

The present invention relates to computers and, more particularly, to the management of updates for computer software. A major objective of the present invention is to provide for optimally selecting updates for a given hardware/software configuration.

Much of modern progress is associated with the increasing prevalence of computers. Computers include one or more processors and memory. The memory stores data and instructions; a processor manipulates data by executing instructions. Instructions are organized into programs to perform meaningful work. While the first programs were quite simple, the size and complexity of the most sophisticated programs have increased exponentially.

Almost inevitably, it becomes necessary or desirable to modify a program: 1) to correct a defect, 2) to address a compatibility issue with other software or hardware, 3) to improve performance, and/or 4) to add features. (If no new features are added, the update is called a "patch"; if new features are added, the update is called an "upgrade".) Instead of replacing an entire program, the program can be updated. Updating can involve actually changing the instructions in a monolithic program. However, partly to facilitate updates, programs are often configured as a group of files so that an update can simply involve a replacing a pre-existing file with an update file.

Update installation can be problematic if the update renders a program incompatible with a program that was previously compatible. Typically, "uninstall" programs are available to restore the pre-update state of the computer. However, the objective of the update is then not accomplished.

Often, available updates are not installed. A user may avoid changing a system that is serving its purpose well; or a user may not be aware of an update's availability. In such cases, available updates can be superseded one or more times before a user tries to update. This can present a choice of updates. Normally, the most recent update is installed. However, if the most recent update is unsuccessful, e.g., raises new compatibility issues, optimizing the selection of updates can be problematic.

Update selection can be difficult for a number of reasons. In the first place, one update may be dependent on another update having been installed. In addition, update successions can be complex since one update can supersede more than one prior update. What is needed is a way to improve update selection when there is a complex succession of updates.

SUMMARY OF THE INVENTION

The present invention provides an update management system including an update chronology generator. In response to a request via a network received at an input of the system, the update chronology generator generates a chronology regarding a given target update. The chronology is generated by accessing a database record for the target update, as well as database records for updates indicated in the target-update record as being succeeded by the target update. The update management system can access a set of one or more databases including an internal database or an external database or both. Preferably, the chronology extends back to the "base" program, and also extends forward to indicate updates that succeed the target update.

The update chronology can be in the form of an update family tree or an update state sequence. In either case, the chronology can be used as a reference when troubleshooting a system. For example, where both an original update state and a fully updated state of a program cause compatibility problems, the update chronology presents intermediate states that may avoid these compatibility problems. When used in conjunction with update dependency information, the update chronology can help in removing unnecessary files from a computer—freeing storage capacity and improving performance. These and other features and advantages of the invention are apparent from the description below with reference to the following drawings.

DESCRIPTION OF THE PREFERRED EMBODIMENTS

Figure 1:
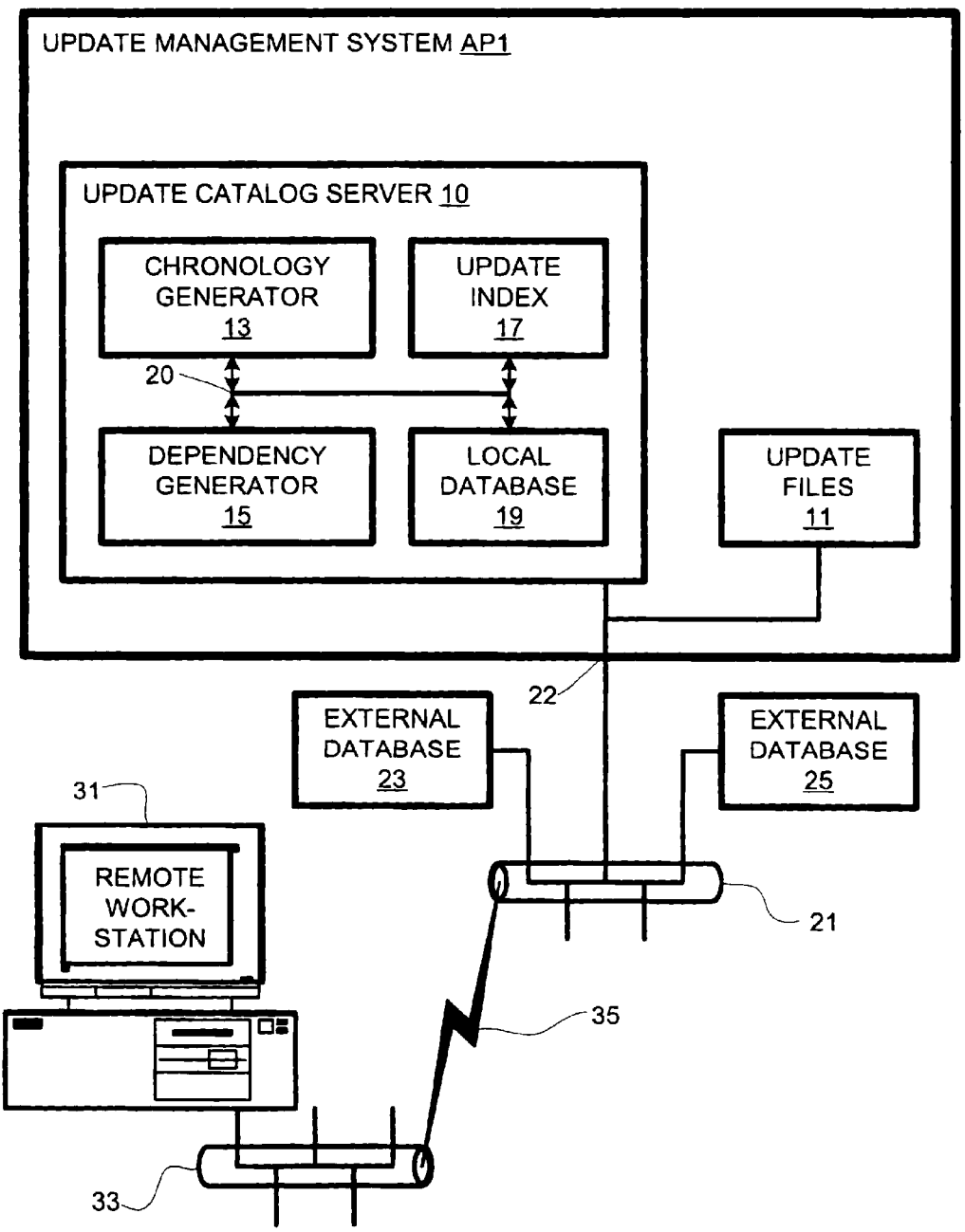
FIG. 1 is a block diagram of an update management system in accordance with the present invention.

In accordance with the present invention, an update management system AP1 comprises an update catalog server 10 and update files 11. Update catalog server 10 includes a chronology generator 13, a dependency generator 15, an update index 17, and a local update database 19. The chronology generator and the dependency generator share a common interface 20 for accessing local update database 19, as well as external databases. Update management system AP1 is connected to a network 21 at a network port 22, on which two update databases 23 and 25 reside. A remote workstation 31 on a remote network 33 communicates with update management system AP1 via an inter-network link 35.

The invention provides for use of one or more databases; each of which can be either local (part of update management system AP1) or remote. Normally, when there are plural databases, they are mutually exclusive as to target updates represented. Alternatively, a local database can be used as a cache to improve performance.

Typically, requests are made to update management system AP1 from a remote workstation, such as remote workstation 31, and are received by update management system AP1 at network port 22. The requests are made for updates to a "base" program, typically residing on the remote workstation. The base program can be an operating system, a utility program, an application program, etc. The updates can be patches—which fix problems or improve performance without adding features, or upgrades, which add features, or both.

The request can be directed toward finding an appropriate update for a given computer system. To this end, the request can include information regarding the hardware configuration, operating system, and co-existing programs on the workstation. Alternatively, a request can concern a particular update. For example, a dependency request can be seek a listing of "prerequisite" files required by the target update.

Of particular interest herein, are "chronology" requests for an update chronology for a target update. For example, a chronology of patches leading up to a target patch from the initial release of the base program. Alternatively, the chronology can specify updates that supersede the target update. Most useful, is a chronology that indicates an entire succession from the base program, through the target update, to its most recent successor.

The response to a chronology request (command line: "$ pft PHKL_8000", where "PHKL_8000" is a hypothetical target update) can be a family tree of the form:

```
          PHKL_9000
          PHKL_8000
       a. PHKL_6000
       b. |   PHKL_3000
       c. |   |   PHKL_1000
       d. |   PHKL_4000
       e. |   PHKL_5000
       f. |       PHKL_2000
       g. PHKL_7000
```

Non-indented updates on succeeding lines are successor updates. In this case, PHKL_8000 has been succeeded only by PHKL_9000. If the latter had been succeeded, its successor would have been listed on the line above PHKL_9000 and with the same indent. It is assumed herein that a target update can only be directly succeeded by one update. Hence, successor updates can be displayed linearly. If it is permitted for a single target update to have multiple direct successors, then the successor updates can be displayed in tree form, as are the predecessor updates.

It is often the case that an update will in effect merge two or more of its predecessors. Hence, the chain of succession up to a target update can have a tree-type structure. Updates that have a common successor are aligned vertically in the report. For example, PHKL_6000 and PHKL_7000 are aligned, since they are both succeeded by PHKL_8000. Likewise, PHKL_6000 succeeds PHKL_3000, PHKL_4000 and PHKL_5000. The report also indicates that PHKL_3000 supersedes only PHKL_1000, and PHKL_5000 supersedes only PHKL_2000. All updates for which no predecessor is indicated are patches to the base program.

Several attributes can be displayed in the report. The report can include a one-line description for each update. In addition, the report can indicate: if an update has been recalled, whether it has dependencies, whether it is critical, and whether it has been reposted. The information included in the report can be determined by selections made in the request itself.

Figure 2:
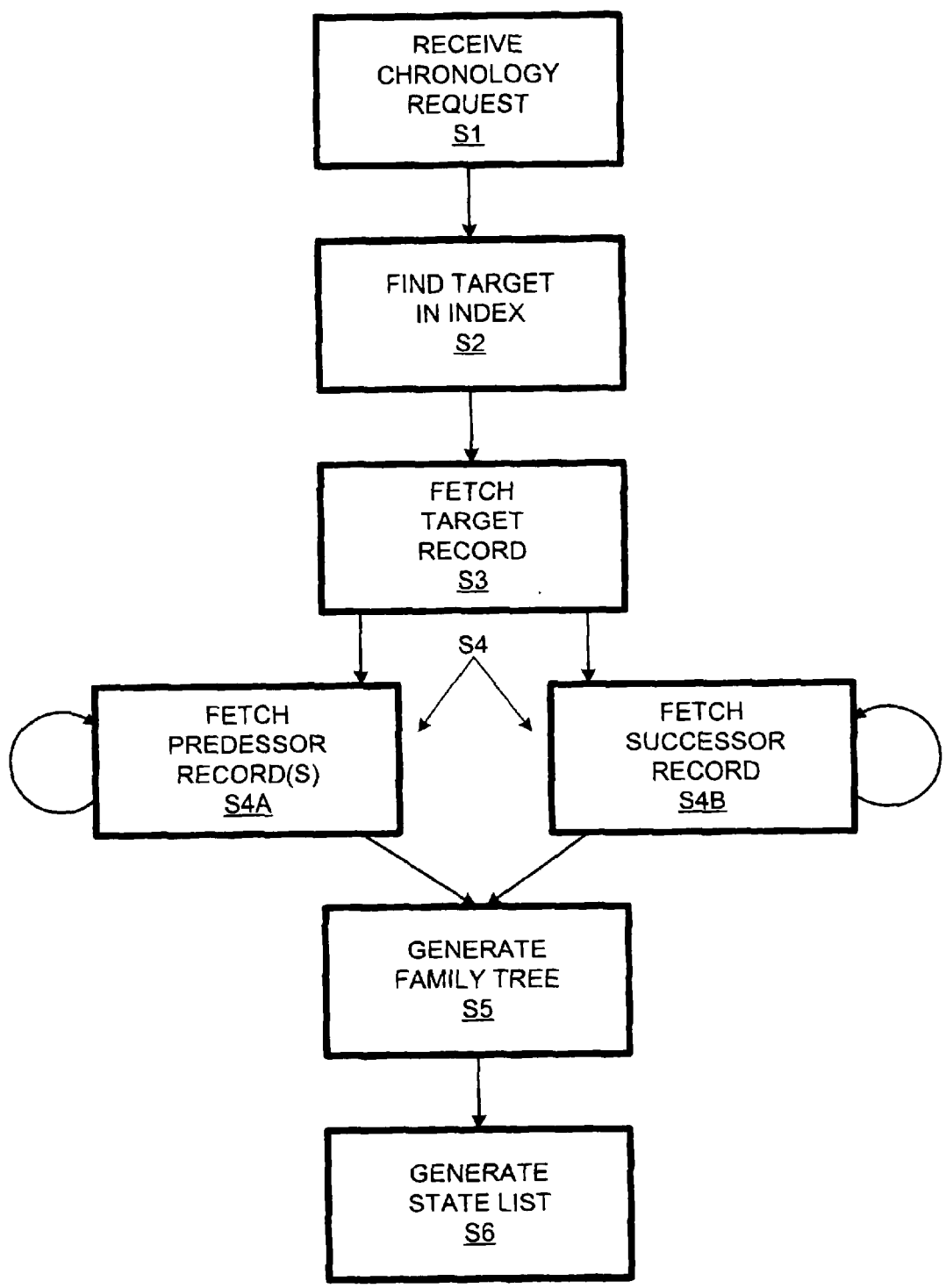
FIG. 2 is a flow chart of a method of the invention practiced in the context of the system of FIG. 1.

A method M1 of the invention is flow-charted in FIG. 2. An update chronology request is received by update management system AP1 at step S1. Update catalog server 10 handles this request. In particular, chronology generator 13 accesses update index 17 to determine the location of an update record for the target update at step S2. Update index 17 lists updates alphabetically and indicates a database and a record number for each update listed therein. The database can be local database 19, considered part of update catalog server 10, or it can be an external database, such as databases 23 and 25 at remote nodes on network 21.

At step S3, chronology generator 13 accesses the database and target record identified in index 17. For small systems with not too many updates, index lookup step S2 is not necessary. However, the larger the number of records and databases, the more time is saved using the index in step S2.

The target record accessed in step S3 must identify any updates directly superseded by the target update. Preferably, any immediate successor to the target update is also identified. Updates can be identified by name, or by database (if more than one) and record number, as they are in index 17. Preferably, both name and database locations are given. The records can contain other information, notably, any prerequisite updates that are required to be installed if the target update is to function. (Note that dependency requests are normally handled by dependency generator 15).

At step S4, the records for any indicated immediate predecessors, step S4A, and for any indicated immediate successor, step S4b, are accessed. If the target record does not indicate the database locations of these records, chronology generator 13 can look up the locations in index 17. Preferably, however, the target record does indicate database locations for the immediate successor and predecessors so this index step can be omitted for higher performance. If, at step S4A, the predecessor records indicate further predecessors update, step S4A is repeated. When, in step S4A, the only predecessor is the base program, the iteration stops. Likewise, if at step S4B, a further successor update is indicated, step S4B is iterated until a successor record is found with no successor update indicated.

Once all the records indicated in step S4 are gathered, chronology generator 13 generates a family tree, as indicated in the example for PHKL_8000 above. Optionally, a state list can be generated at step S5 from the family tree. (Alternatively, the state list can be generated directly, without first generating a family tree.) The state list can indicate a series of workable update states. The following state list corresponds to the PHKL_8000 family tree generated above, given that update names reflective the order in which they were introduced.

| State List: PHKL_8000 | |
|---|---|
| Update | Co-existing Updates |
| (0) | (Base program) |
| PHKL_1000 | (Base program) |
| PHKL_2000 | PHKL_1000 |
| PHKL_3000 | PHKL_2000 |
| PHKL_4000 | PHKL_2000 & PHKL_3000 |
| PHKL_5000 | PHKL_3000 & PHKL_4000 |
| PHKL_6000 | |
| PHKL_7000 | PHKL_6000 |
| PHKL_8000 | |
| PHKL_9000 | |

The family tree or the state table can be used in upgrading a system when the most recent updates cause problems. For example, assume workstation 31 had PHKL_1000 and PHKL_2000 installed at its last update. Also, assume a user for workstation 31 is advised to upgrade to PHKL_8000 for higher performance. The user performs a chronology request and discovers that PHKL_8000 has been superseded by PHKL_9000. The user downloads and installs PHKL_9000 from update manager system AP1. In addition, the user can issue a dependency request handled by dependency generator 15 to ensure all updates required by PHKL_9000 are installed.

Assume that after proper installation, PHKL_9000 causes compatibility problems with a key application program. The user uninstalls update PHKL_9000, returning workstation 31 to its previous state. Instead of choosing only between the most recent update and the most-recent pre-update state, the family tree and state table present a number of intermediate alternatives. The user can work forward or backward through the chronology until the optimal state is found. For each state, dependency checks can be performed for each installed update to ensure that the proper dependency updates are also installed. Thus, the update catalog manager, in particular, the chronology generator, facilitates update optimization.

In addition, the chronology generator can be used to assist removal of unused updates. The dependencies of the replaced updates can be compared with the dependencies of the newly installed updates, and the dependencies that are no longer used can be subject to a reverse dependency analysis. If the reverse dependency analysis turns out negative, the former dependencies can be removed.

While the invention applies generally to updates, it has been implemented in the following patch-family-tree tool (pft) for patches. The following command-line syntax with switches can be used.

```
Usage:  pft -o <os> [-p <platform>] [-s <servers>]
        [-v] [-l] [-r] [-e] [-c] [-a] [-y] [-z]
        [-i <number_of_spaces>] <patch_name_or_number>
where,
    a. <os> = operating system version
    b. examples: 10.20 11.00 11.04
    c. <platform> = { 700 | 800 } (ignored for 11.X)
    d. <servers> =
        i. system1:port1[,system2:port2][, . . . ]
    e. -v = verbose (print one-line descriptions)
    f. -l = show recalled patches
    g. -r = show released patches
        1. -e = show patches with dependencies
        2. -c = show critical patches
        3. -a = show reposted patches
    h. -y = show superceded patches ("older")
    i. -z = show superceding patches ("newer")
        i. (default is to show both)
    j. <number_of_spaces> = to indent each generation
        a. (default and min=1; max=8)
```

The OS is specified with the -o option, and the hardware is specified with the -p option. The hardware platform is not required for any HP-UX 11.X releases.

The tool can be directed to a particular catalog server, or servers, using the -s option. This will override the default value, and any value(s) specified with the CATALOG_SERVERS environment variable.

A patch family tree is generated for a single patch and it must be specified on the command line.

The number of spaces in the indentation can be adjusted using the -i option. Increasing the number of spaces can improve readability of the output report.

The report can include one-line descriptions of each patch, by specifying the -v option, for "verbose" output.

By default, the report will contain patches that are both older than (superseded by) and newer than (supersede) the specified patch. Only the older patches are shown when the -y option is used. Only the newer patches are shown when the -z option is used.

Various attributes of the listed patches can be displayed using several options. If the patch has the requested attribute, a flag will be included in the output listing.

| Option | Output Flag | Description |
|---|---|---|
| -l | RCL | Patch has been recalled. |
| -r | REL | Patch has been released in a Support Plus or Extension Software bundle. |
| -e | DEP, ODEP | Patch has patch dependencies and/or other dependencies. |
| -c | CRIT | Patch is flagged has containing critical defect fixes. |
| -a | REP | Patch was reposted. |

This following example shows the use of the -v (verbose) option and the -i (indentation) option, for the command line beginning with the "$"-sign below. The specified patch supersedes five patches: PHKL_14070, PHKL_14034, PHKL_13676, PHKL_13644, and PHKL_13328. PHKL_14070 supersedes one patch, PHKL_13858, which supersedes PHKL_13552, which supersedes PHKL_13081.

```
$ pft -v -o 11.00 -i 3 -y 14088

# Patch Family Tree
    # PHKL_14088 HP-UX Performance Pack cumulative
      patch
# OS: 11.00

# Only superseded patches are displayed.
    # Superseded patches are indented to the right
    # and go down.
    # Patches aligned in a vertical column are in
    the
    # same "generation".

PHKL_14088 HP-UX Performance Pack; cumulative patch
    a. PHKL_14070 Tape, IOCTL, FC fixes cumulative
       patch
        i. | PHKL_13858 Tape and IOCTL fixes
           cumulative patch
        ii. | PHKL_13552 Large record, seismic
            tape support
        iii. | PHKL_13081 PCI EPIC arbitration
             timeout panic
    b. PHKL_14034 SHMEM_MAGIC Perf,Mem window patch
        i. | PHKL_13810 Memory Windows; pstat;
           space id
        ii. | | PHKL_13278 User stack limits on
            32/64 bit
        iii. | | PHKL_13193 Fix
             panic: hdl_alloc_spaceid
        iv. | | PHKL_13052 pstat(2) number of procs
            limit
        v. | PHKL_13646 Poor perf with SHMEM_MAGIC
           programs
    c. PHKL_13676 Fix C program error in
       badalignment ( )
PHKL_13644 Fix for panic in wait1( )
    d. PHKL_13328 Fix for panic in proc_close( )
```

The following example shows the use of the -y (display older patches) and the -r (denote recalled patch) options. Only patches that are superseded by the specified patch, PHCO_12922, are displayed. The patches that supersede PHCO_12992 (PHCO_12923, PHCO_14842, and PHCO_16591) are not displayed. Note the two recalled patches, PHCO_11909 and PHCO_11908, flagged with the "RCL" keyword.

```
$ pft -v -o 10.20 -p 800 -y -r 12922

# Patch Family Tree
    # PHCO_12922 fsck_vxfs(1M) cumulative patch
# OS: 10.20
# PLATFORM: 800

# Only superseded patches are displayed.
    # Superseded patches are indented to the right
    # and go down.
    # Patches aligned in a vertical column are in
    the
    # same "generation".
# RCL = Recalled patch

PHCO_2922 fsck_vxfs(1M) cumulative patch
    a. PHCO_1909 RCL fsck_vxfs(1M) cumulative patch
        i. PHCO_11908 RCL fsck_vxfs(1M) cumulative
            patch
        ii. PHCO_11223 fsck_vxfs(1M) cumulative
            patch
        iii. PHCO_10965 fsck_vxfs(1M) cumulative
            patch
            1. PHCO_9396 fsck_vxfs(1M) fix for
               file system
```

The recall notices for the "recalled" patches can be viewed using a query tool. The query tool, indicated by the abbreviation "qpc", is used to send a message to the catalog server. Quite often this message takes the form of a query. The query tool reads a message from its command line arguments, sends it to the specified server, waits for the answer, and displays.

```
$ qpc 11909 Warn
PHCO_11909:
    Warn: 97/10/21 - This patch has been recalled.
    Patch PHCO_11909 can cause OmniStorage
        A.02.20 filesystems to be unmountable on
        HP-UX 10.20. The problem is . . .
```

The following example shows the use of the −z (display newer patches) option, and the −e (display patches with dependencies) option. Note that each of the patches that supersede PHCO_11909 has a dependency on at least one other patch.

```
$ pft -v -o 10.20 -p 700 -z -e 11909

# Patch Family Tree
    # PHCO_11909 fsck_vxfs(1M) cumulative patch
# OS: 10.20
# PLATFORM: 700
# Only superseding patches are displayed.
    # Superseding patches are indented to the left
    # and go up.
    # Patches aligned in a vertical column are in
    the
    # same "generation".
# DEP = Patch has dependencies on other patch(es)
# ODEP = Patch has other dependencies

PHCO_16591 DEP fsck_vxfs(1M) cumulative patch
    PHCO_14842 DEP fsck_vxfs(1M) cumulative patch
        i. PHCO_12923 DEP fsck_vxfs(1M) cumulative
           patch
```

-continued

```
        ii. PHCO_12922 DEP fsck_vxfs(1M) cumulative
            patch
            1. PHCO_11909 DEP fsck_vxfs(1M)
               cumulative patch
```

The patch dependencies can be viewed using the patch dependency analysis tool "pdat", as implemented by patch dependency generator 15.

```
$ pdat -v -o 10.20 -p 700 16591
PHCO_18563 LVM commands cumulative patch
PHKL_16750 SIG_IGN/SIGCLD, LVM, JFS, PCI/SCSI
    cum. patch
PHKL_16959 Physical dump devices configuration patch
PHKL_17857 Fix for mount/access of disc sections
PHKL_20610 Correct process hangs on ufs inodes
PHKL_21594 VxFS (JFS) mount, fsck cumulative patch
PHKL_21660 lo_realvfs panic fix, Cum. LOFS patch
PHNE_19937 cumulative ARPA Transport patch
```

The following example shows the use of the −c (flag critical patches) option for a patch family tree command. Patches which have been released with Support Plus and/or Extension Software are flagged when the −r option is specified. PHCO_14198 is a critical patch, and both PHCO_14198 and PHCO_13131 have been released in a Support Plus and/or Extension Software bundle.

```
$ pft -v -o 11.00 -i 3 -c -r 14198

# Patch Family Tree
    # PHCO_14198 crashutil(M) cumulative patch
# OS: 11.00

    a. # Both superseded and superseding patches are
    b. # displayed.
    c. # Superseded patches are indented to the
       right
    d. # and go down.
    e. # Superseding patches are indented to the
       left
    f. # and go up.
    g. # Patches aligned in a vertical column are in
       the
    h. # same "generation".
    i. # REL = Patch released with Extension
         Software and/or
         # Support Plus
# CRIT = Patch contains critical fixes

PHCO_14198 REL CRIT crashutil(1M) cumulative patch
    PHCO_13131 REL crashutil(1M) cumulative patch
```

Critical fix information for a patch, and all patches that it supersedes, can be viewed using qpctree:

```
$ qpctree -f Crit 14198
PHCO_14198:
        Crit: PHCO_14198::
            Yes
            CORRUPTION
        i. PHCO_13131::
        ii. No
```

The following example shows the use of the −a (flag reposted patches) option. In this example, PHCO_10576 has been reposted.

```
$ pft -v -o 10.20 -p 800 -a 14967

# Patch Family Tree
# PHCO_14967 sar(1M) cumulative patch
# OS: 10.20
# PLATFORM: 800

    a. # Both superseded and superseding patches are
    b. # displayed.
    c. # Superseded patches are indented to the
       right
    d. # and go down.
    e. # Superseding patches are indented to the
       left
    f. # and go up.
    g. # Patches aligned in a vertical column are in
       the
       # same "generation".
# REP = Patch was reposted

PHCO_14967 sar(1M) cumulative patch
    PHCO_14228 sar(1) cumulative patch
        PHCO_10576 REP sar(1) cumulative patch
        PHCO_8820 sar(1M) patch
```

The reposting notice can be viewed using qpc:

```
$ qpc 10576 Repost
PHCO_10576:
        h. Repost: 98/04/20
            1. A problem was discovered with
               replacement
            2. patch PHCO_14228.
            3. PHCO_14228 breaks the Year 2000
               compliance
            4. implemented in patch PHCO_8820.
               PHCO_10576
            5. will be re-released until a
               replacement patch
            6. is available.
```

As indicated earlier, the patch tools work as well for upgrades, so they are general to updates. The invention has industrial applicability to both hardware and software manufacturers, as it allows them to organize and distribute their updates both internally and to customers in a manner that optimizes updates for performance and compatibility. Other variations upon and modifications to the described embodiments are provided for by the present invention, the scope of which is defined by the following claims.

What is claimed is:

1. A software program-update management system comprising:
   an input for receiving a request for an update chronology for a target program update;
   an interface for retrieving succession data from a set of databases, said databases having a record corresponding to each update, each record indicating all updates that the update it corresponds to directly supercedes; and
   an update chronology generator for generating an update chronology for said target update by accessing the records for said target update and each update indicated by the record for said target update as being directly superceded by said target update, said generator being coupled to said input and to said interface.

2. A program update management system as recited in claim 1 wherein said update chronology generator further accesses records corresponding to each update succeeding said target update, said update chronology further indicating all updates succeeding said target update directly or indirectly, the database record corresponding to each update indicating any updates directly superceding the update to which it corresponds.

3. A program update management system as recited in claim 1 wherein said update chronology is an update family tree.

4. A program update management system as recited in claim 1 wherein each record indicates an introduction date for the update to which it corresponds, said update chronology being a succession of update states.

5. A program update management system as recited in claim 1 further comprising said update database.

6. A method of generating a program update history, said method comprising:
   a) receiving a request for an update chronology for a target program update;
   b) accessing a record corresponding to said target update in a database, said record indicating updates directly superceded by said target update;
   c) accessing records respectively corresponding to said updates directly superceded by said target update to determine updates indirectly superceded by said target update; and
   d) generating an update chronology from said records, said update chronology indicating updates directly and indirectly superceded by said target update.

7. A method as recited in claim 6 wherein each record identifies an update, if any, superceding the update to which it corresponds, step c) further involving accessing the record of any update indicated as directly succeeding said target update, said update chronology indicating updates directly and indirectly superceding said target update.

8. A method as recited in claims 6 wherein said update chronology is an update family tree.

9. A method as recited in claims 6 wherein each update record indicates an introduction date for the update to which it corresponds, said update chronology is a succession of update states.

10. A method of generating a program update history, said method comprising:
    a) receiving a request for an update chronology for a target program update;
    b) accessing a record corresponding to said target update in a database, said record indicating all updates directly superceded by said target update;
    c) accessing records respectively corresponding to said updates directly superceded by said target update to determine updates indirectly superceded by said target update; and
    d) generating an update chronology from said records, said update chronology indicating updates directly and indirectly superceded by said target update.

* * * * *

UNITED STATES PATENT AND TRADEMARK OFFICE
CERTIFICATE OF CORRECTION

PATENT NO. : 6,907,603 B2
APPLICATION NO. : 10/673842
DATED : June 14, 2005
INVENTOR(S) : John Charles Scott It is certified that error appears in the above-identified patent and that said Letters Patent is hereby corrected as shown below:

In column 10, line 41, in Claim 8, delete "claims" and insert -- claim --, therefor.

In column 10, line 43, in Claim 9, delete "claims" and insert -- claim --, therefor.

Signed and Sealed this

Eighteenth Day of August, 2009

David J. Kappos
*Director of the United States Patent and Trademark Office*